United States Patent
Matta et al.

(10) Patent No.: US 6,738,583 B1
(45) Date of Patent: May 18, 2004

(54) SELF-ALIGNING INFRA-RED COMMUNICATION LINK

(75) Inventors: Farid Matta, Los Altos, CA (US); Storrs T. Hoen, Brisbane, CA (US); Ravindhar K. Kaw, Los Altos, CA (US); Robert C. Taber, Palo Alto, CA (US); Jason T. Hartlove, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/561,691

(22) Filed: May 1, 2000

(51) Int. Cl.[7] .............................................. H04B 10/00
(52) U.S. Cl. ........................ 398/131; 398/129; 398/156
(58) Field of Search ................................. 359/159, 154, 359/143, 152; 385/18, 25, 17, 52, 133; 398/107, 156, 129, 131

(56) References Cited

U.S. PATENT DOCUMENTS

| | | | | |
|---|---|---|---|---|
| 4,823,402 A | * | 4/1989 | Brooks ......................... | 359/159 |
| 5,646,761 A | * | 7/1997 | Medved et al. ............. | 359/172 |
| 5,822,101 A | * | 10/1998 | Deguchi ...................... | 359/172 |
| 6,304,321 B1 | * | 10/2001 | Wangler et al. ............. | 356/4.01 |
| 6,335,992 B1 | * | 1/2002 | Bala et al. .................... | 385/17 |
| 6,466,711 B1 | * | 10/2002 | Laor et al. .................... | 385/18 |

FOREIGN PATENT DOCUMENTS

| | | |
|---|---|---|
| EP | 0 980 154 A | 2/2000 |
| JP | 08 088602 | 4/1996 |
| JP | 08 163041 A | 6/1996 |

OTHER PUBLICATIONS

Tuantranont, a. et al. "Smart Phase–Only Micromirror Array Fabricated by Standard CMOS Process", Proceedings of the IEEE 13th Annual International Conference, Jan. 23, 2000, pp. 455–460.

* cited by examiner

Primary Examiner—Leslie Pascal
Assistant Examiner—Shi K. Li

(57) ABSTRACT

An optical port with directional control. The port includes a transmitter, receiver, and first actuator. The transmitter generates an outgoing light signal that propagates in a transmission direction in response to an outgoing electrical signal. The receiver receives an incoming light signal and generating an incoming electrical signal therefrom, the receiver having a reception direction aligned with the transmission direction. The first actuator alters the transmission direction of the outgoing light signal in response to a first control signal. In one embodiment, the first actuator determines the direction of the outgoing light signal in a first plane, and a second actuator controls the direction of the outgoing light signal by an amount determined by a second control signal. The second actuator controls the direction of the outgoing light signal in a second plane that is orthogonal to the first plane. The actuators can be constructed from beam deflectors that utilize moveable mirrors to alter the transmission direction. In one embodiment, the deflector includes an array of mirrors, each mirror rotating about an axis through the mirror. Actuators that rotate the transmitter and reflector may also be utilized.

3 Claims, 7 Drawing Sheets

FIGURE 5
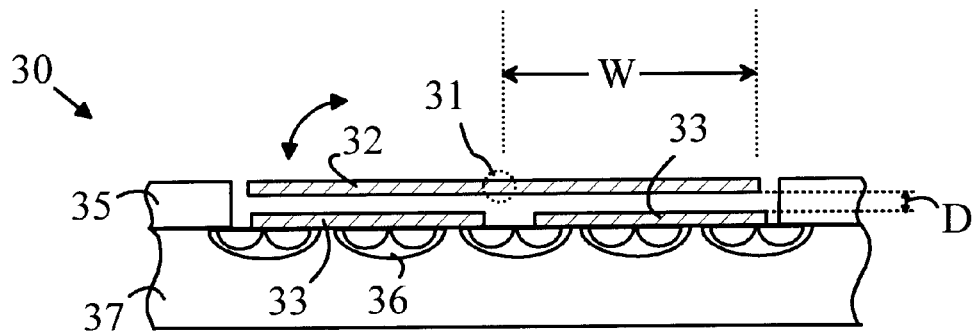
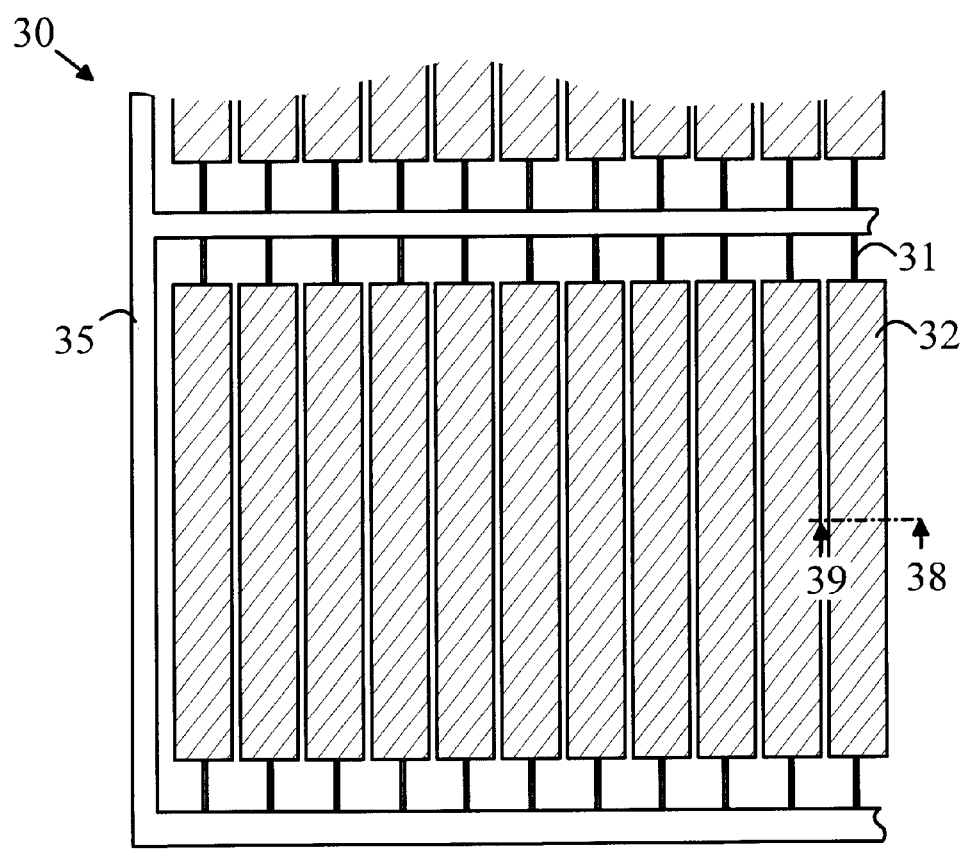
FIGURE 4

FIGURE 6
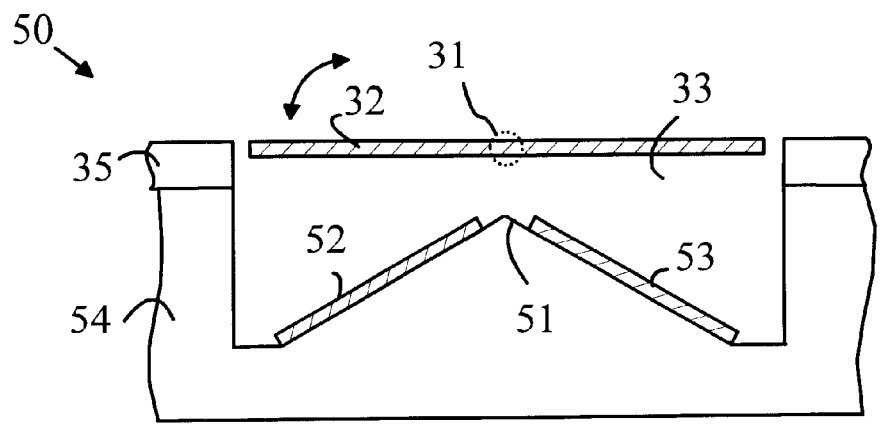
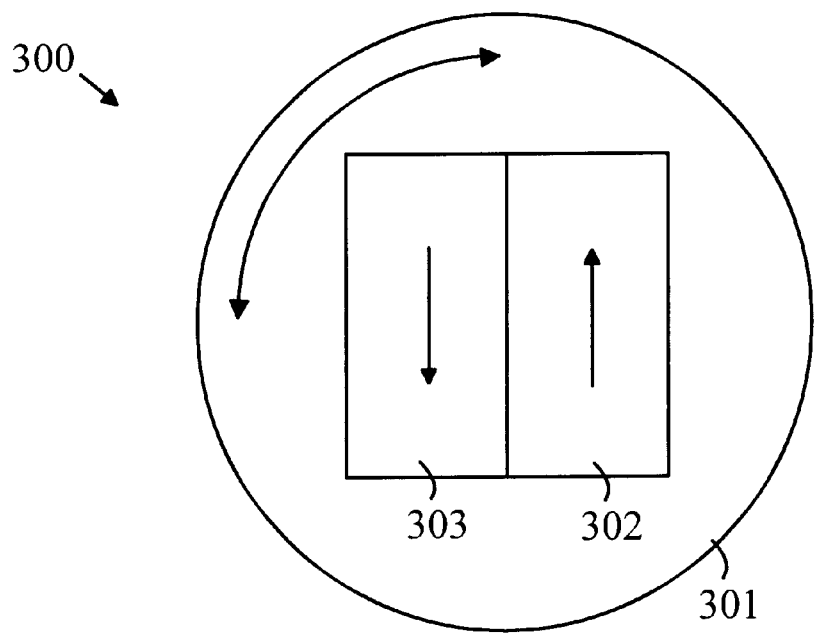
FIGURE 8

FIGURE 7B
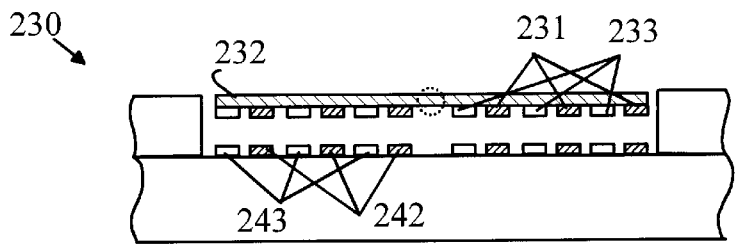
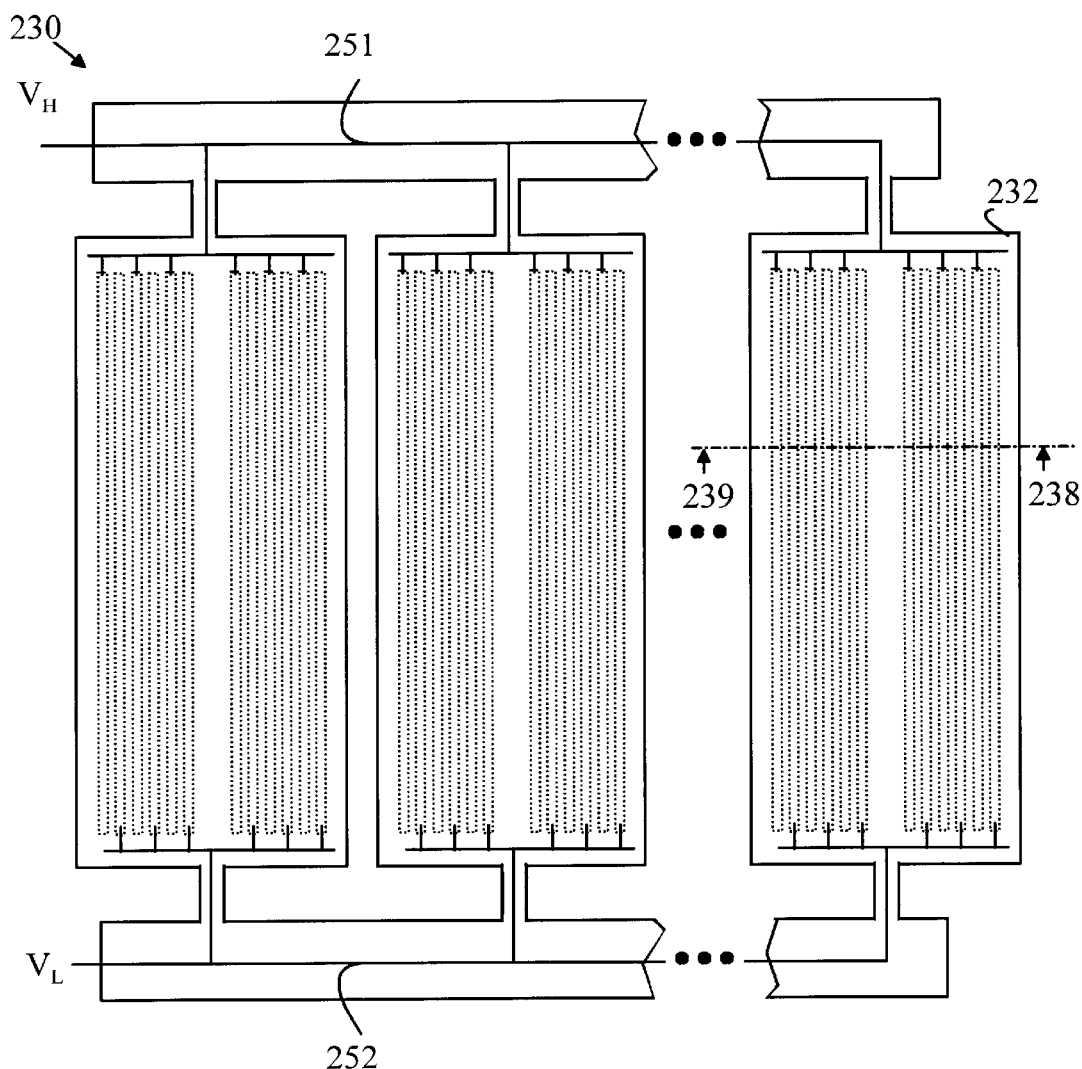
FIGURE 7A

SELF-ALIGNING INFRA-RED COMMUNICATION LINK

FIELD OF THE INVENTION

The present invention relates to light based communication links, and more particularly, to a self-aligning communication link for connecting computer-based devices.

BACKGROUND OF THE INVENTION

Infra-red (IR) communication links are now provided on many computers and devices designed to communicate with computers or with each other. An IR communication link utilizes an IR transmitter and receiver on each device for sending and receiving digital light signals, respectively. Each IR module consists of an IR transmitter, typically a light emitting diode, a photodiode, used to receive the light signals, and electronic circuitry for signal processing and control. The three components are small, relatively simple, and produced in high volumes. Hence, the IR module is generally a very inexpensive component. To establish the IR link, the user aligns the two devices such that the IR transmitter in the first device is aligned with the IR receiver in the second device.

In principle, IR communication links provide an attractive alternative to wires for connecting these devices both in terms of cost and convenience. For example, digital cameras typically include an IR communication link for downloading pictures taken by the camera to a computer. IR communication links have also been used for connecting computers together in networking systems and computers to printers.

While IR communication links have great potential, they have not found wide acceptance among users. As noted above, to initiate a communication between two devices via an IR communication link, the IR transmitter and receiver of the first device must be aligned with the corresponding receiver and transmitter of the second device. In practice, the devices must be aligned to within 20 degrees both horizontally and vertically. This often requires more time and effort than most users are willing to invest. Hence, the IR communication links are seldom used.

In addition, if the devices are to communicate over a distance greater than about 1 meter, the alignment tolerance must be even greater. The light emitting diodes (LEDs) used to generate the IR light signals have an intensity distribution that decreases with the angle from the central ray of the light beam. Hence, when the devices are mis-aligned, the light intensity available for sending and receiving signals decreases. The maximum communication distance is determined by the light intensity available to each device. Hence, mis-aligned devices have reduced range. In principle, the intensity of the transmitters in the IR devices can be increased; however, various safety, battery-life, and cost considerations limit the maximum intensity of the light beam. Accordingly, devices that are mis-aligned by 20 degrees are limited to a communication path of less than one meter.

Broadly, it is the object of the present invention to provide an improved IR communication port.

It is a further object of the present invention to provide an IR communication port that is self-aligning.

These and other objects of the present invention will become apparent to those skilled in the art from the following detailed description of the invention and the accompanying drawings.

SUMMARY OF THE INVENTION

The present invention is an optical port with directional control. The port includes a transmitter, receiver, and first actuator. The transmitter generates an outgoing light signal that propagates in a transmission direction in response to an outgoing electrical signal. The receiver receives an incoming light signal and generating an incoming electrical signal therefrom, the receiver having a reception direction aligned with the transmission direction. The first actuator alters the transmission direction of the outgoing light signal in response to a first control signal. In one embodiment, the first actuator determines the direction of the outgoing light signal in a first plane, and a second actuator controls the direction of the outgoing light signal by an amount determined by a second control signal. The second actuator controls the direction of the outgoing light signal in a second plane that is orthogonal to the first plane. The actuators can be constructed from beam deflectors that utilize moveable mirrors to alter the transmission direction. In one embodiment, the deflector includes an array of mirrors, each mirror rotating about an axis through the mirror. Actuators that rotate the transmitter and reflector may also be utilized.

BRIEF DESCRIPTION OF THE DRAWINGS

FIG. 4 is a top view of a portion of a micro-machined mirror assembly 30.

FIG. 5 is a cross-sectional view through line 38–39 shown in FIG. 4.

FIG. 6 is a cross-sectional view of another embodiment of a mirror element 50 according to the present invention.

FIG. 7A is a top view of mirror assembly 230.

FIG. 7B is a cross-sectional view of one mirror through line 238–239 as shown in FIG. 7A.

FIG. 8 is a top view of another preferred embodiment of the present invention in which only the azimuth direction is optimized.

DESCRIPTION OF THE INVENTION

Figure 1:
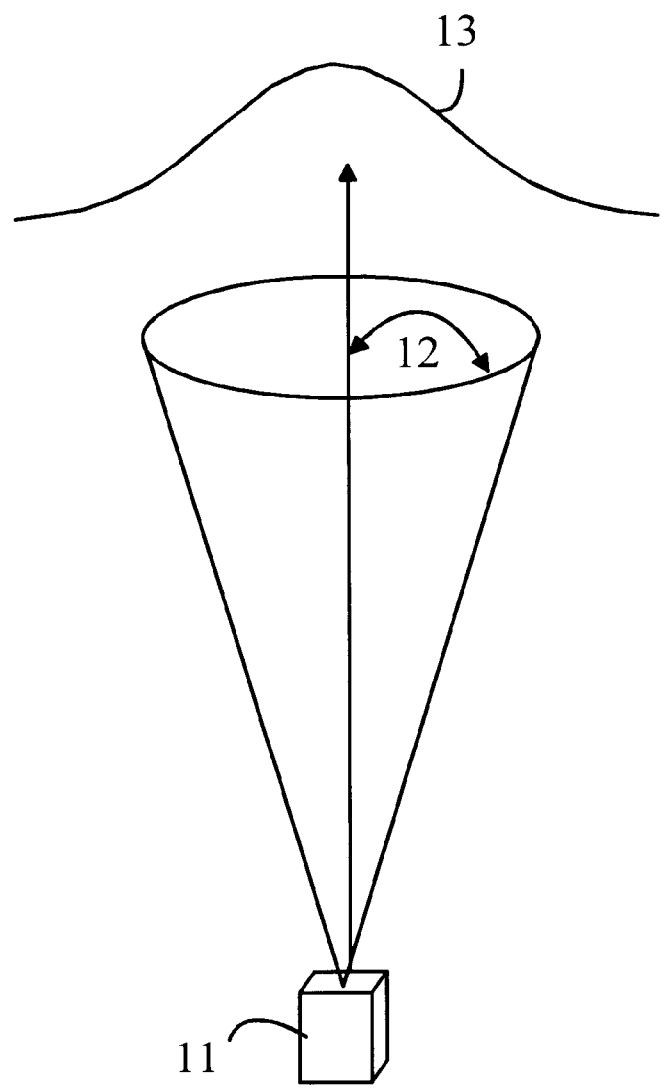
FIG. 1 shows the intensity distribution generated by the LEDs used to generate the light signals transmitted by an IR communication link.

The LEDs used to generate the light signals transmitted by an IR communication link have an intensity distribution that is shown in FIG. 1. The opening angle 12 of the light cone from a typical LED 11 is approximately 20 degrees. The radial intensity distribution of this cone is shown at 13. Each device includes an LED for transmitting light signals and a photodiode for receiving light signals generated by the device at the other end of the communication link.

Figure 2:
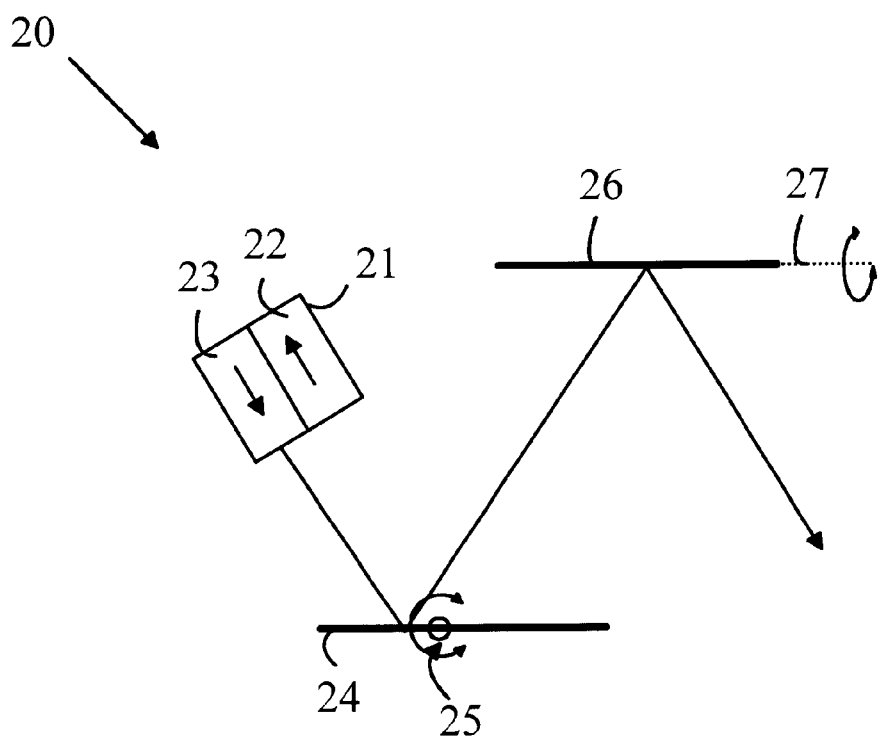
FIG. 2 is a schematic view of an IR port 20 according to the present invention.

The manner in which the present invention provides its advantages can be more easily understood with reference to FIG. 2 which is a schematic view of an IR port 20 according to the present invention. Port 20 includes a transmitter/receiver pair 21 comprising an LED 23 and a photodiode 22. The light generated by LED 23 is reflected off of a first mirror 24 that can be rotated about axis 25 and a second mirror 26 that can be rotated about an orthogonal axis 27. By controlling the angles through which mirrors 24 and 26 are rotated, the light beam from LED 23 can be directed within a range of output angles in both the horizontal and vertical directions. Similarly, light received by mirror 26 along an angle defined by the positions of mirrors 24 and 26 will be reflected onto photodiode 22. The manner in which mirrors 24 and 26 are constructed will be explained in more detail below.

The manner in which an IR link according to the present invention is established between two IR ports such as IR port 20 discussed above will now be discussed in more detail. For the purposes of this discussion it will be assumed that each IR port includes a controller that operates the various mirrors and monitors the signals received on the receiver in the port. For the purposes of this discussion, it will be assumed that IR port number 1 initiates the connection. For example, IR port number 1 may be connected to a computer that is running a program which utilizes the IR port for communication with another device and that program has initiated a data transfer.

Figure 3A:
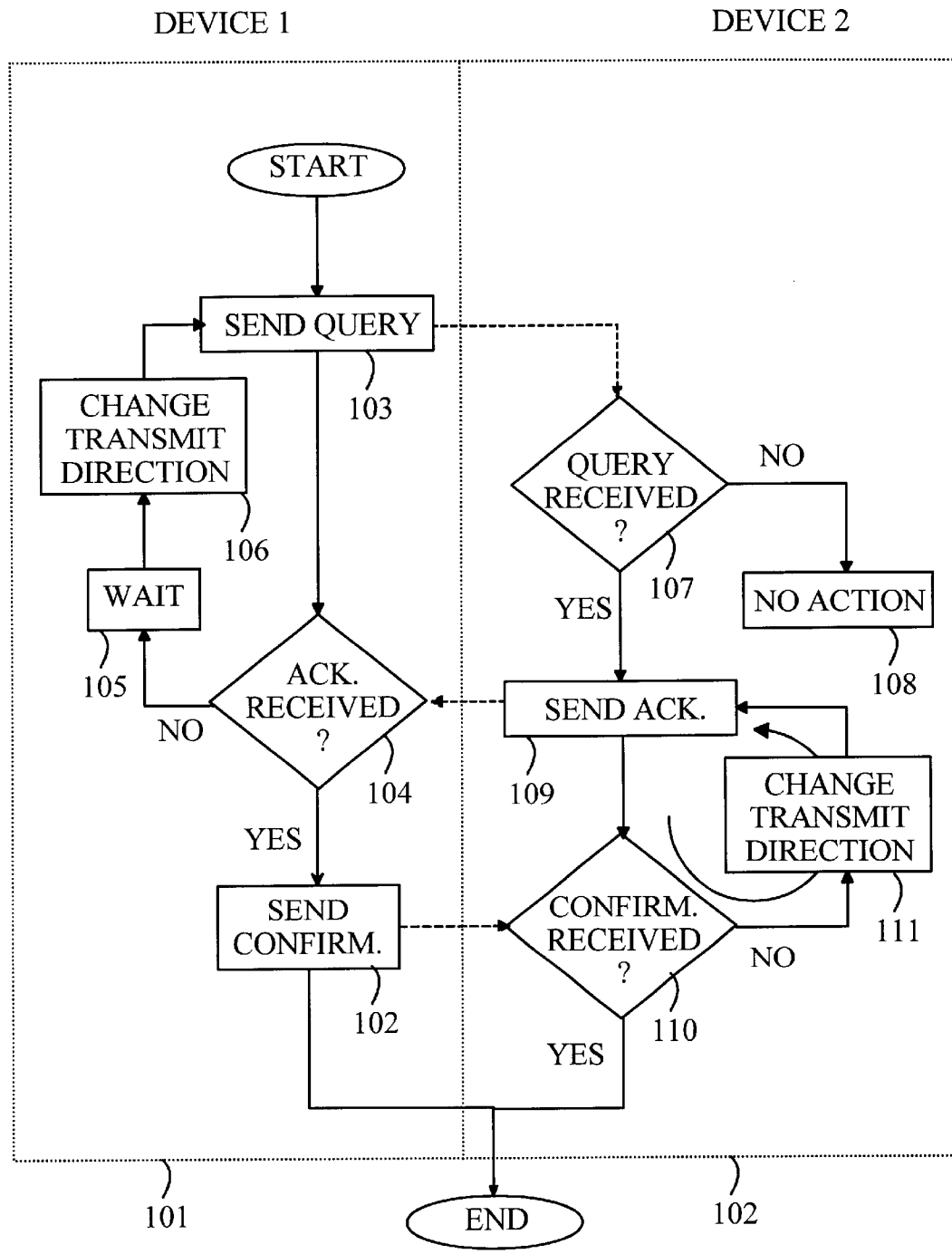
FIGS. 3A–B are flow charts illustrating the protocol used to establish and optimize the communication link involving the multiple interactions and scenarios between two devices.

The protocol used to establish and optimize the communication link involves multiple interactions between the two ports as well as multiple scenarios that depend on their relative positions. This complex algorithm is easier understood with the aid of the flow charts shown in FIGS. 3A–B. In these charts, the logical dependencies are shown in solid lines, and the optical signals between the ports are shown in dashed lines. The flow chart for the actions taken by port 1 is shown at 101, and the flow chart for the actions taken by port 2 is shown at 102. The first part of the algorithm, shown in FIG. 3A, brings the ports into sufficient alignment to establish a handshake between the communicating ports. It assumes that both ports are misaligned such that each is out of the angular range of the other. The protocol proceeds generally in the following manner:

1. Port 1 sends a query to port 2 and awaits an acknowledgement as shown at 103–106. Port 2 monitors its input port for a query as shown at 107–108. When port 2 receives a query, it sends an acknowledgement signal in all possible transmit directions as shown by the loop at 109–111. The wait time is designed to allow port 2 to cycle through possible positions of its transmit beam.
2. If no acknowledgement is received, port 1 increments the angle of its transmit beam as shown at 106 and repeats step 1.
3. When an acknowledgement is received from port 2 as shown at 104, port 1 sends a confirmation, and the handshake is complete.

Figure 3B:
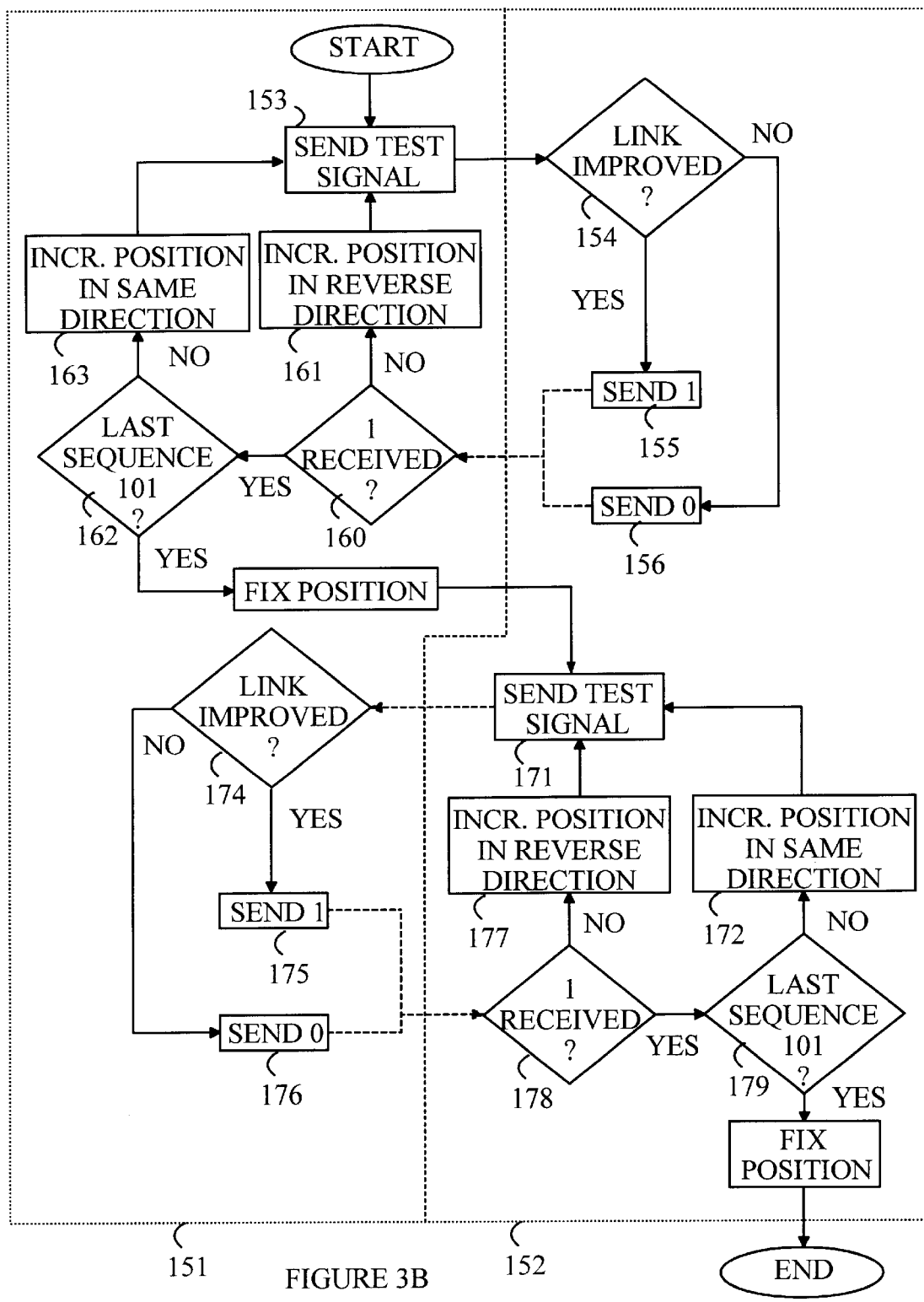

Upon completion of the handshake, the ports proceed to optimize the link according to the algorithm shown in FIG. 3B, which is a flow chart of the algorithm carried out by each port during optimization. The flow-chart for the operations carried out by port 1 is shown at 151, and the flow chart for the operations carried out by port 2 is shown at 152. The algorithm proceeds as follows:

1. Port 1 increments the position of its transmit beam in an arbitrary direction and sends a test signal as shown at 153. Port 2 sends back a code indicating that reception has improved or degraded as shown at 154-156. For the purposes of this discussion, a (1) indicates improvement and a (0) indicates no improvement.
2. A (1) code causes port 1 to increment its beam position in the same direction as in the previous step; and a (0) code causes it to increment its beam position in the reverse direction as shown at 161–163.
3. If the last three received codes constitute a (101) sequence, port 1 is in an optimum position and it signals port 2 to initiate a similar process in the opposite direction as shown at 171–179.

It should be noted that the signaling protocol can be carried out at a relatively low frequency and still provide satisfactory performance as measured by the time needed to complete the alignment process. For example, if each beam has 5 positions, each port requires 25 attempts at handshaking. An alignment time of the order of one second is more than adequate for most applications. Hence, the system can utilize a signaling protocol that takes 20 msec. per handshaking attempt. Accordingly, the signal-to-noise ratio can be improved during the alignment process by utilizing long pulses for the signaling.

As noted above, the goal of the search algorithm is to determine the mirror positions in each IR port that provide the maximum signal strength for communications between the two IR ports. The number of mirror positions at which a handshaking protocol can be successfully completed will depend on the number of discrete positions that each mirror can occupy. If this number is relatively small, there will only be one or two positions at which the handshaking protocol will succeed. As the number increases, the angular step size of the search algorithm decreases, and hence, a number of "acceptable" positions may be present. The acceptable positions will, in general, define a cone of angles within which acceptable signal strength is present. The mirror positions at the center of this cone will, in general, also be the position of maximum signal strength.

The angular coverage of the IR port described above, and, therefore, the effectiveness of this invention, depends on the ability to deflect the beam at relatively large angles. For example, in order to increase the angular coverage from the standard 20 degrees to 60 degrees, the beam should be deflected by 20 degrees in each direction. If mirrors are used to deflect the beam, then a 10-degree rotation of the mirror will produce the required 20 degree beam deflection. For this application, each mirror needs to have a reflective area of at least 1 square millimeter.

Since IR modules are inherently low-cost, miniature, devices, the present invention requires an inexpensive, preferably micromachined, mirror design. There are a number of micromachined rotating mirror designs known to the art; however, low-cost designs are limited to mirror sizes and angles of rotation far below the required values, while large-size, large-angle designs would impose unacceptable costs if utilized in the present invention. To those skilled in the art of micromechanics, it is obvious that the requirements of large mirror size and large angles of rotation are mutually exclusive in low-cost, electrostatically actuated, mirror designs operating at reasonable actuation voltages.

Refer now to FIGS. 4 and 5. These figures describe a novel mirror design that takes advantage of the fact that beam coherence is not required in IR communications, and, therefore, one large mirror can be replaced with a multiplicity of small mirrors moving synchronously. The conflict between large size and the large angle of rotation is resolved by dividing the required area of the mirror into a plurality of small elongated mirror elements, each of which is sufficiently narrow to allow the required rotation. FIG. 4 is a top view of a portion of a micro-machined mirror assembly 30, and FIG. 5 is a cross-sectional view through line 38–39 shown in FIG. 4. Mirror assembly 30 is constructed from a plurality of micro-machined mirrors 32 that have been etched from a substrate 35 that is bonded to a second substrate 37. Each mirror is connected to substrate 35 via a flexible link 31 that allows the mirror to rotate about an axis through the flexible link. The force needed to rotate each mirror element is generated by an electrostatic actuator 33, which consists of two conductive electrodes facing each other. The actuation potential is applied to the appropriate actuator either from an off-chip source or with the aid of control circuitry 36 that is embedded in the silicon substrate 37 on which the mirror assembly is mounted. The top surfaces of the mirrors are covered with a highly reflective coating, typically a film of gold about 0.2 micron thick.

The angular rotation of the mirror about the flexure point is determined by the potential applied to the actuator. For a given actuation voltage, V, the spacing D is approximately related to the half-width, W, by the following equation:

$$D = (WV\sqrt{(kk_o LT)})/2$$

Where k is the dielectric constant, $k_o$ is the permittivity of free space, L is the length of the mirror, and T is the required torque. For practical values of voltage and torque, the maximum displacement, D that can be obtained is relatively small, in the range of 2–5 microns.

Hence, to achieve a large angular displacement, the half-width, W, of each mirror must also be small. As a result, a single micro-machined mirror having a maximum angular displacement of ±10 degrees would be too small to reflect a significant fraction of the IR beam generated by the transmitter. The present invention overcomes this problem by utilizing a mirror constructed from a large number of small mirrors. The array of mirrors is structurally similar to a venetian blind. All of the small mirrors move in unison. To further increase the reflecting area, several such venetian blind assemblies can be combined.

The maximum angular displacement can be increased by etching the substrate under the mirror into a peaked structure as shown in FIG. 6 which is a cross-sectional view of another embodiment of a mirror element 50 according to the present invention. To simplify the following discussion, those elements that serve the same functions as elements shown in FIG. 5 have been assigned the same numeric designations. Mirror element 50 differs from the mirror element formed from mirrors 32 shown in FIG. 5 in that the underlying substrate 54 has been etched to form a peaked structure 51 on which the actuator electrodes 52 and 53 have been deposited. To simplify the drawing, the control circuitry has been omitted from FIG. 5.

The embodiments depicted in FIGS. 4, 5 and 6 belong to the general category of attractive electrostatic actuators. Those skilled in the art will recognize that such devices require special provisions to prevent snap-in and stiction. Snap-in is the phenomenon where the two electrodes snap into contact once the gap is narrowed to about one third of its original value. Stiction is the phenomenon where the actuator electrodes stay in contact even without actuation voltage. An embodiment that works in a repulsive mode, and is, therefore, free from such problems is shown in FIGS. 7A–B at 230. FIG. 7A is a top view of mirror assembly 230, and FIG. 7B is a cross-sectional view of one mirror through line 238–239. In this embodiment, shown in FIG. 7, each electrode of the actuator 33 is patterned as two sets of strips with a spatially alternating voltage pattern $V_H$ and $V_L$. Exemplary electrodes connected to the $V_H$ power bus 251 are shown at 242 and exemplary electrodes connected to the $V_L$ power bus 252 are shown at 243. A similar set of electrodes is provided on the bottom side of the mirror as shown at 231 and 232. The electrodes on the bottom side of the mirror and the electrodes facing them on the underlying substrate must be in precise alignment for this actuator to work properly. When a voltage pattern is applied to the substrate electrodes which matches the voltage pattern on the mirror, i.e. when $V_H$ faces $V_H$ and $V_L$ faces $V_L$, the actuator is in a repulsive mode, and that side of the mirror is lifted. This design, although somewhat more difficult to fabricate, is free from snap-in and stiction problems and provides the additional advantage of fine control of mirror position.

This actuator can also be operated in a push-pull mode, where on one side of the mirror the substrate electrodes are energized in the dipolar regime described above in order to work in a repulsive mode, while on the other side of the mirror the substrate electrodes are energized with an opposite voltage patterns, i.e. with $V_H$ on the substrate facing $V_L$ on the mirror and vice versa. That side of the actuator works in the attractive mode, and the mirror is pulled down. In this regime, lower voltages can be utilized to achieve a given mirror tilt.

This actuator can also be operated in a push-pull mode in which one side of the mirror is repelled from the substrate while the other side is attracted to the substrate. This embodiment has the advantage of requiring lower drive voltages to achieve any given mirror tilt.

The embodiments described above change both the azimuth and the elevation of the IR beam. However, in most practical applications the communicating ports are roughly at the same elevation and are operated in a horizontal position. Hence, embodiments that change only the azimuthal directions of the IR beams using a one-mirror arrangement are also useful.

Refer now to FIG. 8, which is a top view of another preferred embodiment of the present invention in which only the azimuthal direction is optimized. IR port 300 is constructed from a receiver 303 and a transmitter 302 that are mounted on a micromachined rotary stepper motor 301 having a rotational axis perpendicular to the plane of the drawing. A number of designs exist for such micromovers. For example, J. Sniegowski et al. "Monolithic geared-mechanisms driven by a polysilicon surface-micromachined on-chip electrostatic microengine," Proc. Solid-State Sensor and Actuator Workshop, pp. 178–182 (1996) describes a micoengine built from thin deposited polysilicon. A second example of such a micromover is described in A. A. Yaseen et al. "A Rotary Electrostatic Micromotor 1×8 Optical Switch," Proc. IEEE 11th Annual International Workshop on Micro Electro Mechanical Systems, p 116 (1998). While this device is more robust than the device constructed from thin polysilicon, it requires high voltages to operate.

The above-described embodiments of the present invention have utilized IR ports. However, it will be obvious to those skilled in the art from the preceding discussion that the teachings of the present invention can be applied to any optical port.

Various modifications to the present invention will become apparent to those skilled in the art from the foregoing description and accompanying drawings. Accordingly, the present invention is to be limited solely by the scope of the following claims.

What is claimed is:

1. An optical port comprising:
   a transmitter for generating an outgoing light signal that propagates in a transmission direction in response to an outgoing electrical signal;
   a receiver for receiving an incoming light signal and generating an incoming electrical signal therefrom, said receiver having a reception direction aligned with said transmission direction; and
   a first actuator for altering said transmission direction of said outgoing light signal in response to a first control signal, said first actuator comprising an array of mirrors, each mirror in said array rotating about an axis through said mirror, said axes being aligned with respect to one another, wherein each mirror in said array rotates synchronously with said other mirrors in said array in response to said first control signal such that each mirror rotates through the same angle, said outgoing light signal simultaneously illuminating a plurality of said mirrors.

2. The optical port of claim 1 wherein said first actuator determines the direction of said outgoing light signal in a first plane and wherein said optical port further comprises a second actuator for altering the direction of said outgoing light signal by an amount determined by a second control signal, said second actuator controlling said direction of said outgoing light signal in a second plane that is orthogonal to said first plane.

3. The optical port of claim 1 wherein said array of mirrors deflects said outgoing light signal in a first plane and wherein said optical port further comprises a beam deflector for deflecting said outgoing light signal by an amount determined by a second control signal in a second plane, said second plane being orthogonal to said first plane.

* * * * *